United States Patent
Park et al.

(10) Patent No.: US 10,523,553 B2
(45) Date of Patent: Dec. 31, 2019

(54) IMPLEMENTING AN E-LAN BETWEEN MULTI-NODES UTILIZING A TRANSPORT NETWORK CONTROLLER

(71) Applicant: KT Corporation, Seongnam-si, Gyeonggi-do (KR)

(72) Inventors: Choon-gul Park, Daejeon (KR); Ji-eun Lee, Daejeon (KR); Chan-kyou Hwang, Daejeon (KR)

(73) Assignee: KT CORPORATION, Seongnam-si (KR)

( * ) Notice: Subject to any disclaimer, the term of this patent is extended or adjusted under 35 U.S.C. 154(b) by 115 days.

(21) Appl. No.: 15/203,039

(22) Filed: Jul. 6, 2016

(65) Prior Publication Data
US 2017/0012816 A1    Jan. 12, 2017

(30) Foreign Application Priority Data
Jul. 7, 2015 (KR) .................. 10-2015-0096766

(51) Int. Cl.
*H04L 12/24* (2006.01)
*H04L 12/721* (2013.01)

(52) U.S. Cl.
CPC .................. *H04L 45/12* (2013.01)

(58) Field of Classification Search
CPC . H04W 36/14; H04W 48/16; H04W 28/0247; H04W 76/022
See application file for complete search history.

(56) References Cited

U.S. PATENT DOCUMENTS

| 2008/0310430 | A1 | 12/2008 | He | |
| 2010/0306408 | A1* | 12/2010 | Greenberg | H04L 12/4633 709/238 |
| 2012/0140775 | A1* | 6/2012 | Kawahara | H04L 41/0896 370/437 |
| 2012/0147893 | A1* | 6/2012 | Shabtay | H04L 12/40189 370/395.53 |
| 2014/0269330 | A1* | 9/2014 | Parameswaran | H04L 47/125 370/238 |
| 2014/0362686 | A1 | 12/2014 | Jogalekar et al. | |
| 2015/0095498 | A1* | 4/2015 | Tourrilhes | H04L 47/748 709/226 |
| 2015/0319078 | A1* | 11/2015 | Lee | H04L 12/6418 370/392 |

FOREIGN PATENT DOCUMENTS

| KR | 10-2015-0000152 A | 1/2015 |
| KR | 10-2015-0054006 A | 5/2015 |

* cited by examiner

*Primary Examiner* — Romani Ohri
(74) *Attorney, Agent, or Firm* — Hamre, Schumann, Mueller & Larson, P.C.

(57) ABSTRACT

A method performed under a transport SDN (Software Defined Network) controller may include classifying respective ones of a plurality of target nodes as either first target nodes that belong to a first domain or second target nodes that belong to a second domain, selecting a first core node in the first domain and a second core node in the second domain, calculating a first pseudo-wire (PW) between the selected first core node and the classified first target nodes, and calculating a second pseudo-wire (PW) between the selected second core node and the classified second target nodes.

15 Claims, 11 Drawing Sheets

FIRST DOMAIN 200A
SECOND DOMAIN 200B
THIRD DOMAIN 200C

- ○ RANDOM NODE
- ● TARGET NODE
- ● CORE NODE
- ── CONNECTION LINK
- ━ PW
- ◎ ROOT NODE

FIG. 2B
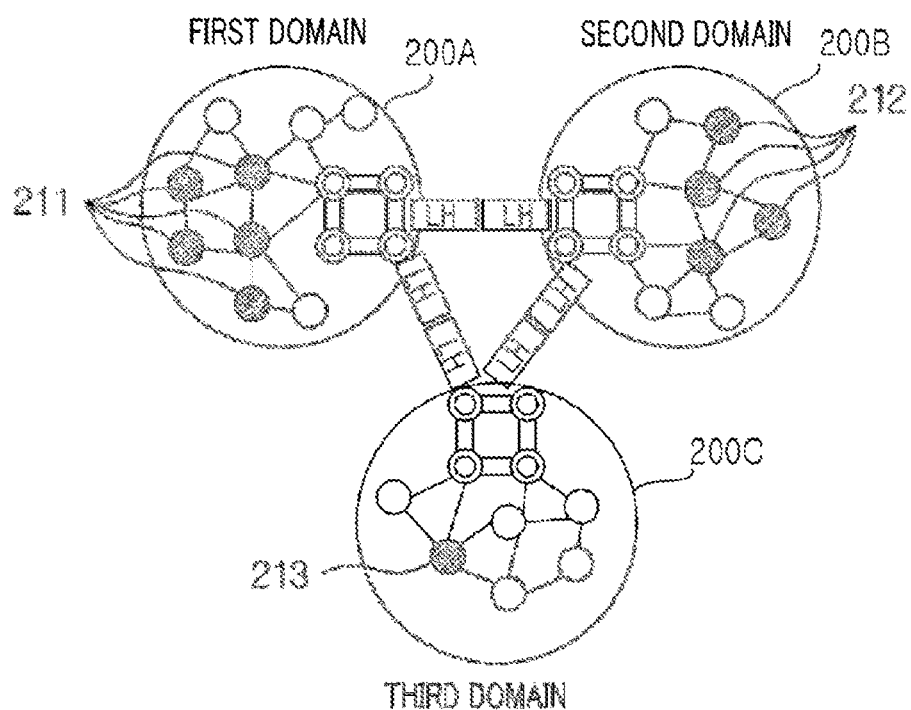
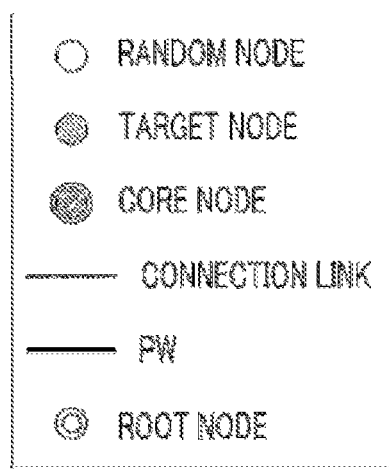

*FIG. 2C*
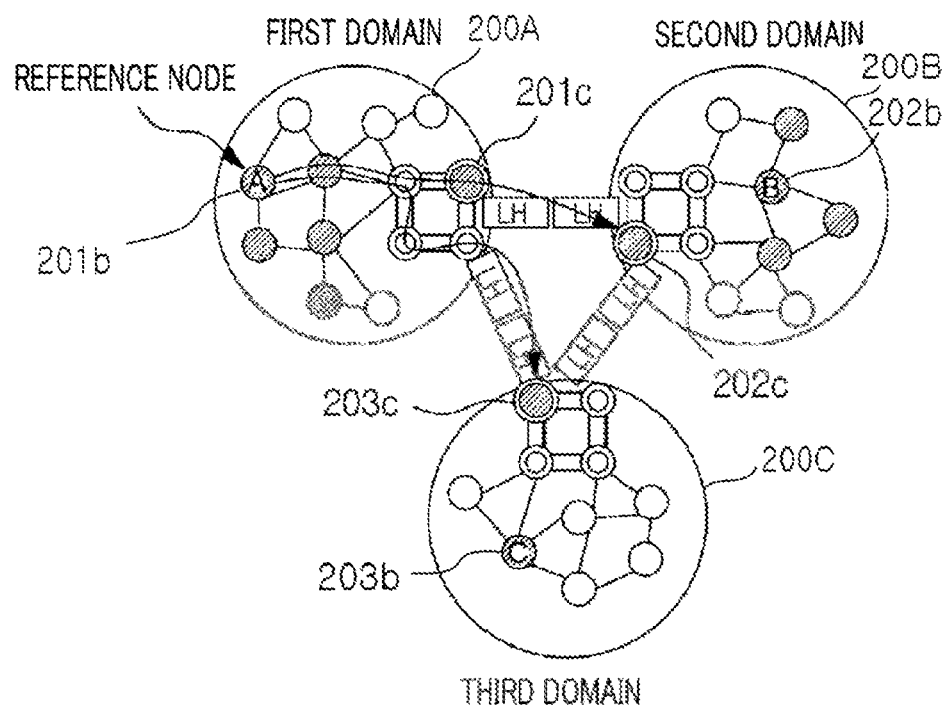
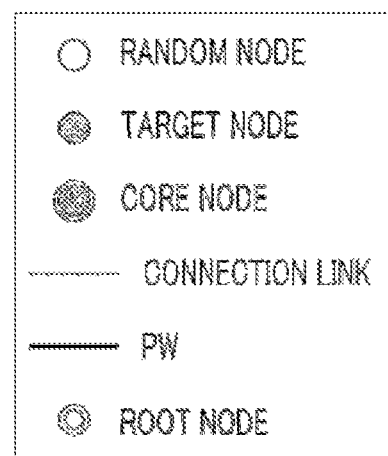

IMPLEMENTING AN E-LAN BETWEEN MULTI-NODES UTILIZING A TRANSPORT NETWORK CONTROLLER

CROSS-REFERENCE TO RELATED APPLICATION

This application claims the benefit of Korean Patent Application No. 2015-0096766 filed on Jul. 7, 2015, the disclosures of which are incorporated herein by reference.

TECHNICAL FIELD

The embodiments described herein pertain generally to a communication system, including a transport SDN (Software-Defined Network) controller that provides E-LAN service between multi-nodes.

BACKGROUND

An E-LAN (Ethernet Local Area Network) or EVP-LAN (Ethernet Virtual Private LAN) service is a multipoint-to-multipoint Ethernet virtual connection service defined by the MEF (Metro Ethernet Forum). The MEF also defined an E-Line service for point-to-point Ethernet virtual connection service and an E-Tree service for point-to-multipoint Ethernet virtual connection service.

A conventional TDM (Time-division multiplexing) SDH (Synchronous Digital Hierarchy)-based network has evolved into an Ethernet line-based PTN (Packet Transport Network). Further, point-to-point services, including an E-LAN service that connects multiple nodes via a virtual Ethernet, have been in increasing demand.

SUMMARY

In one example embodiment, a method performed under a transport SDN (Software Defined Network) controller includes classifying respective ones of a plurality of target nodes as either first target nodes that belong to a first domain or second target nodes that belong to a second domain, selecting a first core node in the first domain and a second core node in the second domain, calculating a first pseudo-wire (PW) between the selected first core node and the classified first target nodes, and calculating a second pseudo-wire (PW) between the selected second core node and the classified second target nodes.

In another example embodiment, a method performed under a transport SDN controller includes classifying a plurality of target nodes that belong to a corresponding domain, selecting a core node, in the corresponding domain, to be connected with the classified target nodes, and calculating a pseudo-wire (PW) between the selected core node and classified target nodes in reference to the core node.

In yet another example embodiment, a transport SDN controller includes a path request processor configured to receive a multi-node path request from a client, a database configured to store network information related to network devices included in a first domain and a second domain, and a path calculator configured to retrieve the network information from the database, and classify, based on the network information, respective ones of a plurality of target nodes as either first target nodes that belong to the first domain or second target nodes that belong to the second domain, select a first core node in the first domain and a second core node in the second domain, calculate a first pseudo-wire (PW) between the selected first core node and the classified first target nodes, and calculate a second pseudo-wire (PW) between the selected second core node and the classified second target nodes.

The present disclosure relates to methods, programs and applications, systems, and apparatuses for providing, facilitating, and/or controlling optimum path computation and provisioning for a multipoint-to-multipoint E-LAN service for a transport SDN controller in a wide area network (WAN).

According to example embodiments described herein, an E-LAN service between multi-nodes in a WAN, using a NBI (North Bound Interface) provided by a transport SDN controller, may be defined. Thus, it is possible to provide a new service for sharing network resources and implementing a virtual private network (VPN).

When providing the E-LAN service between multi-nodes in a WAN, integrated control may be performed through the transport SDN controller. Thus, it is possible to integrate separate operations corresponding to respective domains in the WAN into one operation, and thus reduce the number of operators and reduce errors caused by operator intervention.

Further, at least some of the example embodiments of the E-LAN service between multi-nodes described herein implements a series of automated operations such as selection of an end port, optimum path computation, provisioning, and line test.

The aforementioned path computation may be performed rapidly taking into consideration domains, network hop count, available network resource information, and the like. Thus, it is possible to considerably reduce a service-provided time.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Hereinafter, the present disclosure will be described with reference to the exemplary embodiments illustrated in the accompanying drawings. For understanding of the present disclosure, throughout the accompanying drawings, like components are assigned like reference numerals. The configuration illustrated in the accompanying drawings is exemplified only to explain the present disclosure but not intended to limit the scope of the present disclosure.

FIGS. 2A-2D show variations of an example embodiment of an E-LAN service, in accordance with the descriptions provided herein;

DETAILED DESCRIPTION

Figure 1:
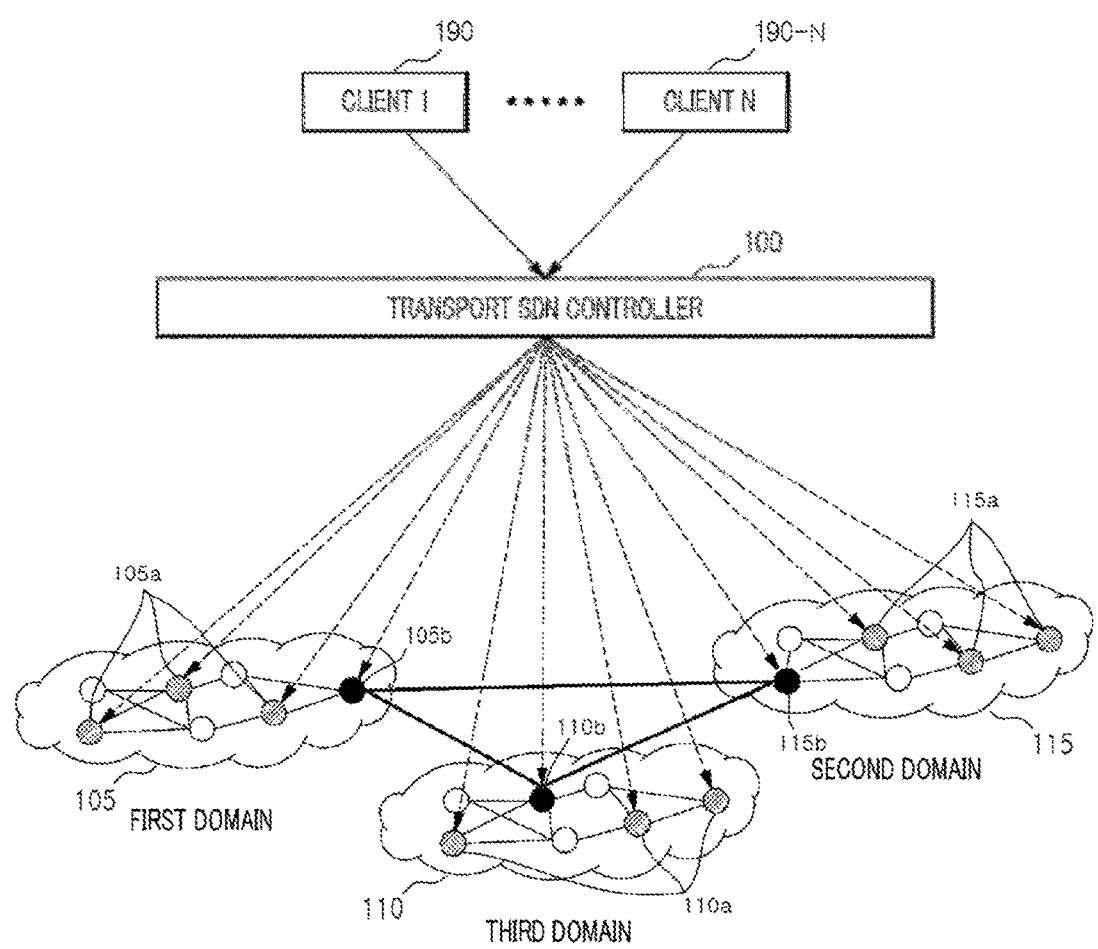
FIG. 1 illustrates a system for implementing an E-LAN service by a transport SDN controller, in accordance with at least some embodiments described herein.

FIG. 1 illustrates a system for implementing an Ethernet virtual connection (E-LAN) service between multiple nodes, by a transport SDN controller, in accordance with at least some embodiments described herein.

Referring to FIG. 1, a structure for providing an E-LAN service includes a transport SDN controller 100, a client 190, and a wide area network ("WAN") among first domain 105, second domain 110, and third domain 115. Although the example of FIG. 1 shows three domains, embodiments of implementing an E-LAN between multi-nodes utilizing a transport network controller may be applicable to any quantity of domains.

Transport SDN controller 100 is a functional entity configured to control relevant components (e.g., switches, routers, etc.) for controlling the traffic or the flow of one or more data packets in an E-LAN. In accordance with the example embodiments described herein, transport SDN controller 100 is not limited to a specific physical implementation or a specific implementation location. By way of example, transport SDN controller 100 may be implemented by a controller functional entity as defined in the ONF (OpenFlow), the IETF (Internet Engineering Task Force), the ETSI (European Telecommunication Standards Institute), and/or the ITU-T (International Telecommunication Union Telecommunication).

Transport SDN controller 100 may perform integrated control of network devices present in a WAN. Examples of such control including centrally collecting and integrating configuration information, topology, and resource information for the WAN. That is, the transport SDN controller 100 may centrally integrate control functions distributed to domains 105, 110, and 115, or to network devices. Such control may also include implementing an integrated control function over an application, thus providing a North Bound Interface (NBI), which enables one or more of clients 190 through 190-N or the application, which is hosted by one or more of clients 190 through 190-N, to autonomously design and control its respective network. An NBI is an interface provided to the one or more of clients 190 through 190-N, through a request may be transmitted to the transport SDN controller 100 and results may be received in response to the request. Via an NBI, the transport SDN controller 100 may receive a request for an E-LAN service, e.g., a request for calculating an optimum path, from a respective one of clients 190 through 190-N. When transport SDN controller 100 computes an optimum path for the WAN, the computed optimum path may be provided to a respective one of clients 190-190-N. Transport SDN controller 100 may receive a request for an E-LAN service, e.g., a request for generating an Ethernet virtual connection among the network devices or for modifying a setting for the Ethernet virtual connection, e.g., bandwidth or network topology. SDN controller 100 may then transmit an instruction to control the corresponding network device in response to the request from the client 190, and thus secure necessary network resources to provide the Ethernet virtual connection.

One or more of clients 190-190-N may be a platform of a third party supplier that provides a user application or a network connection service. One or more of clients 190-190-N may be Virtual Network Operator (VNO) or Mobile virtual network operators (MNVO). The client 190 submits, provides, or transmits the request for an E-LAN service to the transport SDN controller 100.

A WAN may include network devices capable of providing an end-to-end Ethernet connection service and connection links among the network devices, and provides a southbound interface (SBI) that can be controlled by the transport SDN controller 100. The network devices may include or correspond to functional entities, such as switches or routers, capable of substantially forwarding, switching, or routing traffic in the WAN. The network devices may include a packet-based transport networks (PTN). The wide area network may be divided into multiple domains, e.g., first domain 105, second domain 110 and third domain 115, and domains may be connected to each other by a network device such as a ROADM (Reconfigurable optical add-drop multiplexer). Each domain may include target nodes 105a, 110a or 115a and a core node 105b, 110b or 115c. Target nodes 105a, 110a and 115a may be connected to the corresponding core node 105b, 110b or 115c, and the core nodes 105b, 110b and 115c are connected each other.

FIGS. 2A-2D show variations of an example embodiment of an E-LAN service, in accordance with the descriptions provided herein.

Figure 2A:
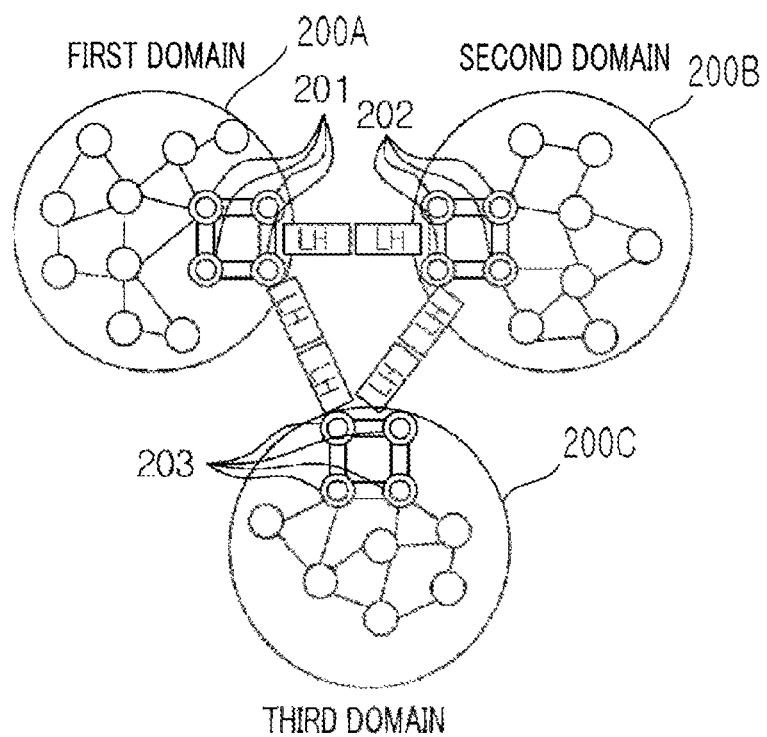

FIG. 2A illustrates a wide area communication network (WAN) that includes three domains. As set forth above, although the examples herein show three domains, embodiments of implementing an E-LAN between multi-nodes utilizing a transport network controller may be applicable to any quantity of domains. The 200A, 200B, . . . , and 200N include multiple nodes, each node being a network device, e.g., PTN (Packet Transmission Network), which may be connected to a User Network Interface (UNI). The nodes are connected by connection links, each connection link being formed by one or more network devices. However, the network devices forming a connection link are not illustrated in FIG. 2A. First to third domains respectively include route nodes 201, 202, and 203 as uppermost nodes which are connected to random nodes and in charge of wide area connections in the corresponding domain.

FIG. 2B illustrates the WAN of FIG. 1, further including target nodes for which an E-LAN service is requested, in accordance with the descriptions provided herein. In response to a multi-node path request RequestPathEvplan transmitted by the client 190, target nodes 211, 212, and 213 are determined respectively in first to third domains 200A-200C, respectively. A target node is a network device, e.g., a PTN, located in an area for which an E-LAN service is requested by the client 190, and is a node connected to a UNI such as a switch.

FIG. 2C illustrates the WAN of FIG. 1, further depicting a method for identifying or determining a core node in each of the first to third domains 200A-200C, in accordance with the descriptions provided herein. A core node is identified, determined, and/or selected by selecting two random nodes in different domains and computing a shortest path between the two nodes. A node found first in a target domain may be selected as a core node. In FIG. 2C, a node A 201a may be selected from first domain 200A, a node B 202b may be selected from the second domain 200B, and a node C 203b may be selected from the third domain 200C. Herein, it is assumed that the node A 201b is selected as a reference node. A shortest path from the reference node A 201b to the node B 202b is calculated by a shortest path algorithm, e.g., Dijkstra algorithm, then, a shortest path from the node A 201b to the node B 202b via nodes 201c and 202c is determined. In this case, a core node in the second domain 200B is node 202c, which may be found along the computed shortest path between reference node A 201b and node B 202b. Likewise, a shortest path from reference node A 201b to node C 203b may be calculated, a node 203c is determined as a core node in the third domain 200C. In the first domain 200A that includes reference node A 201b, the last node in the shortest path between node A 201b and node B 202b may be identified as or determined to be a core node; or a shortest path from the node B 202b or the node C 203b to the reference node A 201b is computed, and then, a node found first in the first domain 200A may be determined as a core node. In FIG. 2C, the node 201c is identified as or determined to be a core node.

Figure 2D:
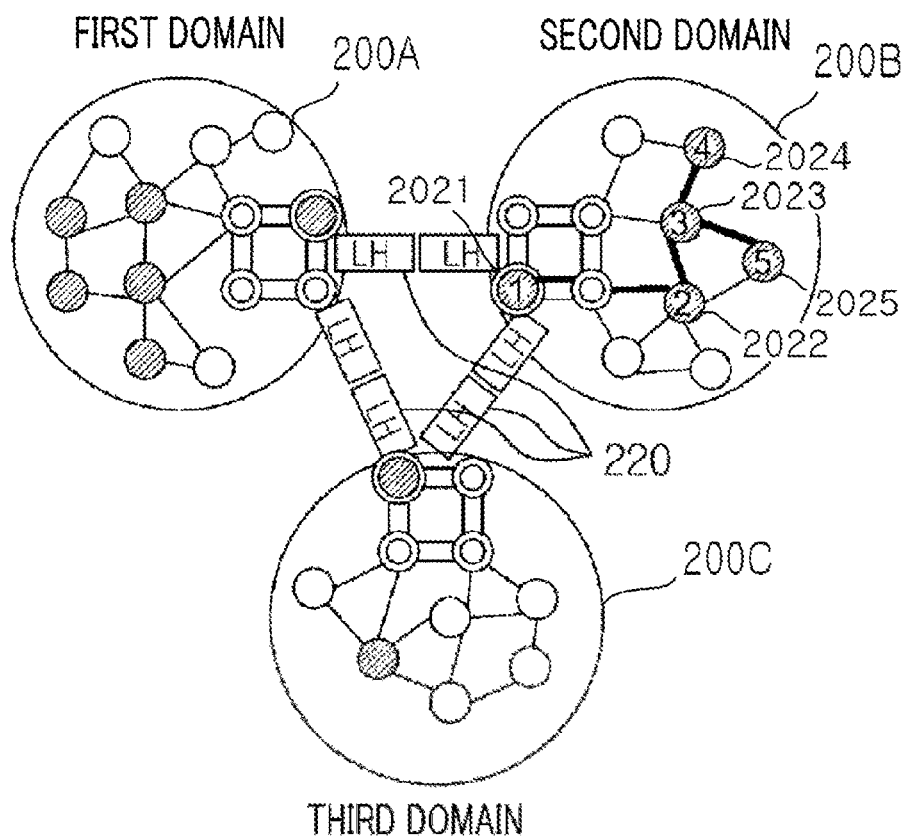

FIG. 2D illustrates the WAN of FIG. 1, further depicting an example of a method for computing an E-LAN path (PseudoWire; PW) between multiple target nodes in the second domain 200B. A PW computation may be performed for an identified or determined core node in each domain. For example, in second domain 200B, a node 1 2021 is a core node and nodes 2 to 5 2022 to 2025 are target nodes. By applying an algorithm for a shortest path between the node 1 2021 and the nodes 2 to 5 2022-2025, target nodes located in the shortest path from the node 1 are identified or determined. In FIG. 2D, (node 1, node 2) is a determined as a shortest path pair, then node 2 2022 is connected to node 1 2021 in PW. When a shortest path between the nodes 1 and 2 2021 and 2022 included in the shortest path pair and the nodes 3 to 5 2023-2025 is calculated, (node 2, node 3) is determined as a shortest path pair, then node 3 2023 is connected to node 2 2022 in PW. Likewise, if a shortest path pair with respect to the node 4 2024 and node 5 2025 is determined, the PW computation with respect to the second domain is ended. Then, the PW computation with respect to another domain is performed. Meanwhile, for load distribution between domains and line stability, a PW between multiple core nodes is formed in a full mesh configuration.

Figure 3:
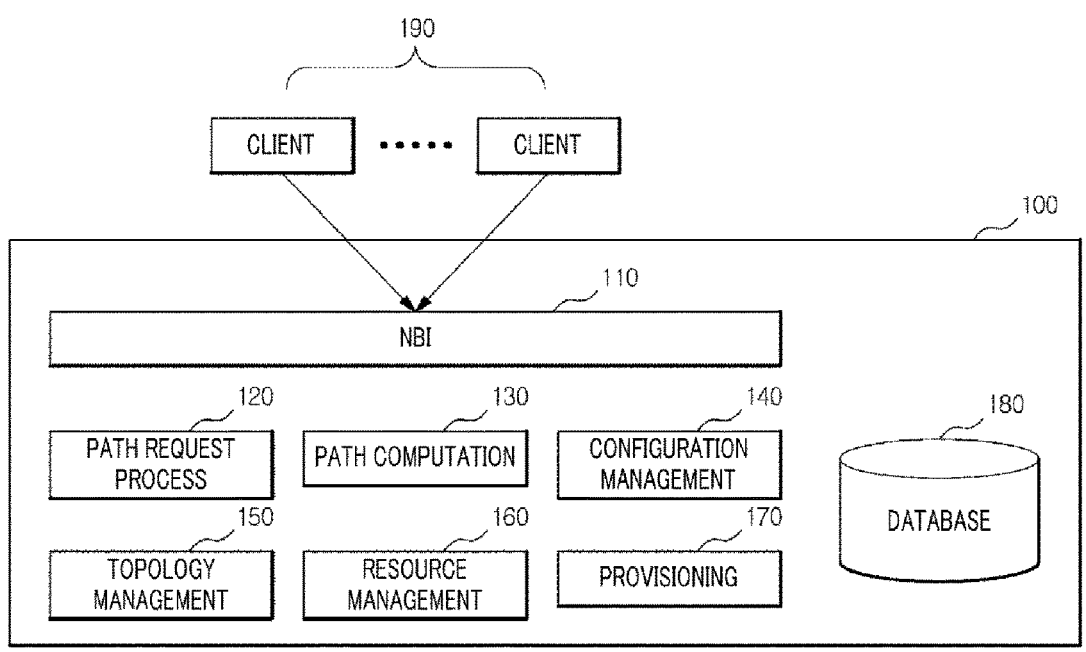
FIG. 3 is an example system diagram illustrating a configuration of the transport SDN controller illustrated in FIG. 1, in accordance with at least some embodiments described herein.

FIG. 3 is an example system diagram illustrating a configuration of the transport SDN controller illustrated in FIG. 1, in accordance with at least some embodiments described herein Referring to FIG. 3, the transport SDN controller 100 includes at least NBI (North Bound Interface) 110, path request process module 120, path computation module 130, configuration management module 140, topology management module 150, resource management module 160, provisioning module 170, and database 180.

NBI 110 serves as an Application Programming Interface (API) by which any one of clients 190-190-N or a hosted or executed application may control functions provided by the transport SDN controller 100. Examples of such control function include, but are not limited to, multi-node optimum path calculation and provisioning.

Path request process module 120 may be programmed, designed, and/or configured to authenticate a user or device in response to the multi-node path request from any one of client devices 190-190-N transmitted via NBI 110. If the requesting one of clients 190-190-N is authenticated, the path request process module 120 may call an internal function module to process an operation with respect to the interface, and transmits a final result to the client 190.

Path computation module 130 computes or calculates an optimum path between multiple target nodes, as requested by one or more of client devices 190-190-N, with regard to network information including domains, network hop count, available network resource information searched from the database 180. For example, the optimum path may be calculated such that the network hop count is small, and there is a lot of available network resource, and a network failure does not occur. An optimum path computation algorithm executed by the path computation module 130 will be described with reference to FIG. 5 to FIG. 7.

Configuration management module 140 may be programmed, designed, and/or configured to regularly collect WAN configuration information such as components, units, ports, logic ports, and usage data of the all network devices constituting the WAN, from a WAB SBI. If a change in WAN configuration occurs, the configuration management module 140 may store and maintain the updated WAN configuration information.

Topology management module 150 may be programmed, designed, and/or configured to regularly collect WAN topology information, such as information regarding a physical connection and a logical connection between networks. If a change in topology of WAN occurs, the topology management module 150 may store and maintain the updated WAN topology information.

Resource management module 160 may be programmed, designed, and/or configured to regularly collect resource information including, e.g., information for network resources currently being used and information for available network resources on the basis of the wide area network configuration information and topology. If a change in resources occurs, resource management module 160 may store and maintain the updated resource status.

Provisioning module 170 may be programmed, designed, and/or configured to generate instructions according to automatically computed optimum path and assignment information and transmits the instruction to the network devices.

Database 180 may store and maintain network information managed by configuration management module 140, topology management module 150, and resource management module 160. The stored network information may be used for an optimum path computation or calculation by the path computation module 130, in order to provide an E-LAN service.

Figure 4:
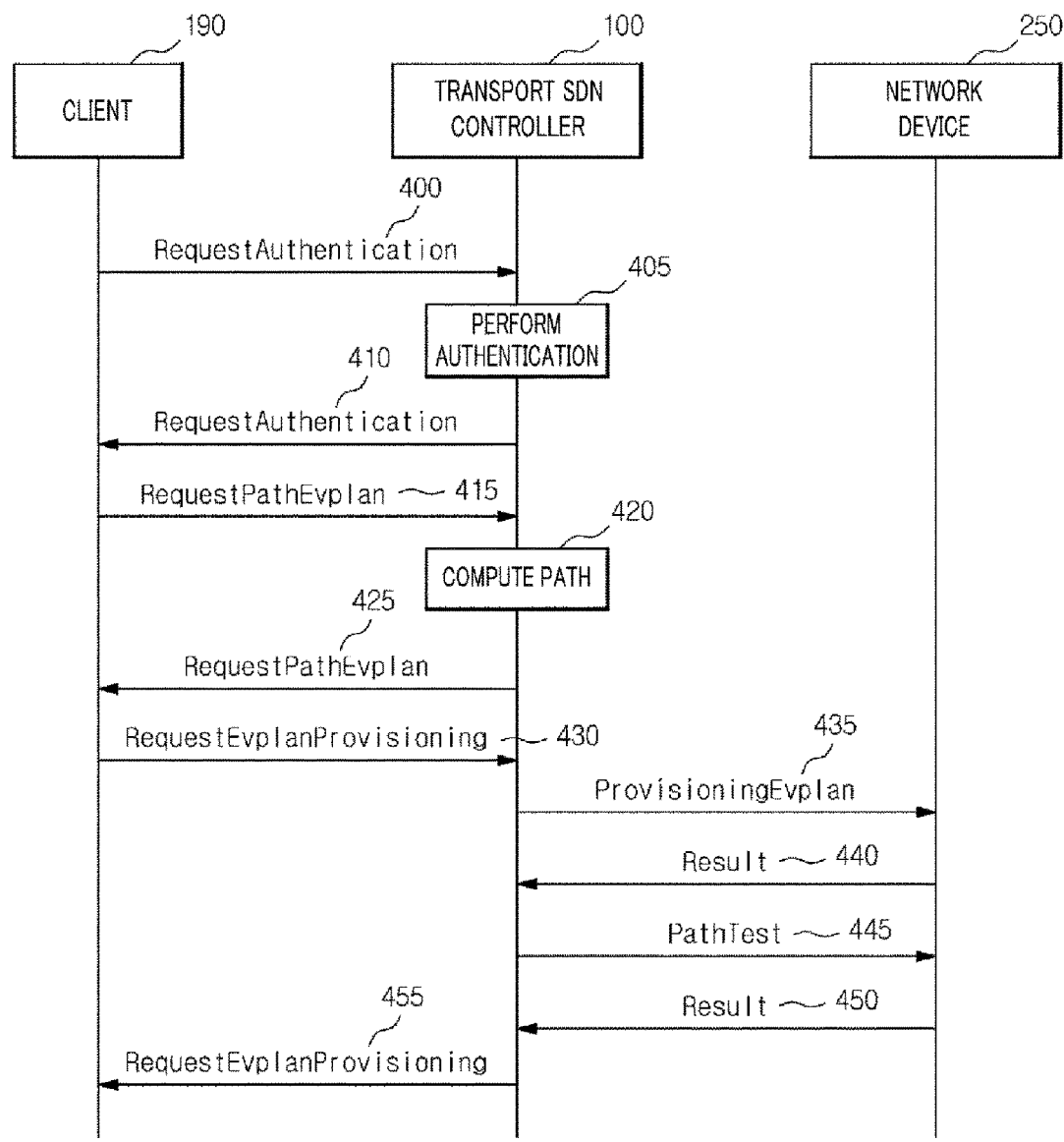
FIG. 4 is an example flow diagram illustrating a method for providing an E-LAN service by a transport SDN controller, in accordance with at least some embodiments described herein.

FIG. 4 is an example flow diagram illustrating a method for providing an E-LAN service by a transport SDN controller, in accordance with at least some embodiments described herein.

In operation 400, at least one of client devices 190-190-N calls an authentication NBI to provide authentication information and makes an authentication request, in order to use an E-LAN service provided by the transport SDN controller 100. The authentication request RequestAuthentication transmitted by requesting client device 190 may be transferred via NBI 110 to the path request process module 120. Herein, the authentication request RequestAuthentication may include authentication information, such as an ID and a password of client devices 190-190-N.

In operation 405, path request process module 120 may authenticate requesting client device 190 if the ID and the password are matched.

In operation 410, path request process module 120 of the transport SDN controller 100 may determine whether requesting client device 190 is an effective user on the basis of the authentication information provided by client device 190. Path request process module 120 may then transmit an authentication result RequestAuthentication to client device 190 via NBI 110. Herein, the authentication result RequestAuthentication may include an authentication result token required for connection of the NBI 110 for an E-LAN service to be provided to the client devices 190-190-N.

In operation 415, requesting client device 190 may call NBI 110 of the transport SDN controller 100 to request a path for an E-LAN service. The multi-node path request RequestPathEvplan transmitted by client device 190 may include the authentication result token and multi-node information MultiNodes. The multi-node information may refer to information for each node corresponding to an E-LAN, e.g., E-LAN bandwidth, target node information, and a user bandwidth.

The multi-node path request RequestPathEvplan may further include bandwidth guarantee information GuaranteedYN indicating whether or not an E-LAN bandwidth is automatically increased to fully satisfy bandwidth requirements requested by requesting client device 190.

The E-LAN bandwidth is the sum of user bandwidths, and is a bandwidth of a PW in a domain including target nodes. A bandwidth between domains may be ½ of the sum of bandwidths of the connected core nodes. If an automatic increase is selected (i.e., bandwidth guarantee information GuaranteedYN=yes), the transport SDN controller 100 may automatically compute or calculate and assign an E-LAN bandwidth to the connected nodes.

In operation 420, NBI 110 of the transport SDN controller 100 may determine the authentication result token supplied by the client 190 and call path computation module 130. Path computation module 130 may compute or calculate an optimum path on the basis of network information stored in the database 180, and transfer a multi-node path request result RequestPathEvplan to requesting client device 190 via NBI 110 (Process 425). The multi-node path request result RequestPathEvplan may include the computed or calculated multi-node path and a reference number RefNumber. The computed multi-node path MultiNodesComputedPath may include end port information, PW information, and E-LAN bandwidth information. The reference number RefNumber is a reference number assigned to the computed multi-node path MultiNodesComputedPath and automatically generated when the computed multi-node path MultiNodesComputedPath is stored in the database 180.

In operation 430, requesting client device 190 may determine the computed multi-node path MultiNodesComputedPath and then call NBI 110 of the transport SDN controller 100 to request provisioning to active an actual E-LAN service. The provisioning request RequestEvplanProvisioning transmitted by requesting client device 190 may include the authentication result token and the reference number RefNumber.

In operation 435, NBI 110 of the transport SDN controller 100 may determine token information and call provisioning module 170. Provisioning module 170 may generate and transmit an instruction ProvisioningEvplan for provisioning to each of network devices 250 located in the PW.

In operation 440, each of the network devices 250 may perform an operation in response to the ProvisioningEvplan and then transmit a result Result to transport SDN controller 100. A VSI (Virtual Switch Instance) may be set in network devices 250 corresponding to a core node and a target node located in each domain by provisioning. Then, the network devices 250 in which the VSI is set are connected each other by a computed PW. Herein, target nodes in the same domain are connected in a tree configuration by a computed PW, and core nodes of each domains are connected each other in a full mesh configuration.

In operation 445, the transport SDN controller 100 transmits an instruction PathTest for a test to target nodes constituting an actual E-LAN service.

In operation 450, the network device 250 corresponding to the target nodes performs a test for identifying the connection between network devices is generated and transmits a result Result to the transport SDN controller 100.

In operation 455, if the test result satisfies actually needed performance, the transport SDN controller 100 transmits a provisioning result RequestEvplanProvisioning to requesting client device 190. The provisioning result RequestEvplanProvisioning may include a path test result.

The path computation, the provisioning and the path test described in operations 415 to 455 may be requested at the same time. That is, if the client 190 transmits a multi-node provisioning request to NBI 110 of the transport SDN controller 100 in operation 415, the path computation (operation 420), the provisioning (operations 435 and 440), and the path test (operations 445 and 450) are performed and then a multi-node provisioning result RequestPathAndProvisioningEvplan may be transmitted to requesting client device 190. The multi-node provisioning result RequestPathAndProvisioningEvplan may include the authentication result token and multi-node information MultiNodes, and the multi-node provisioning result RequestPathAndProvisioningEvplan includes the reference number RefNumber.

Figure 5:
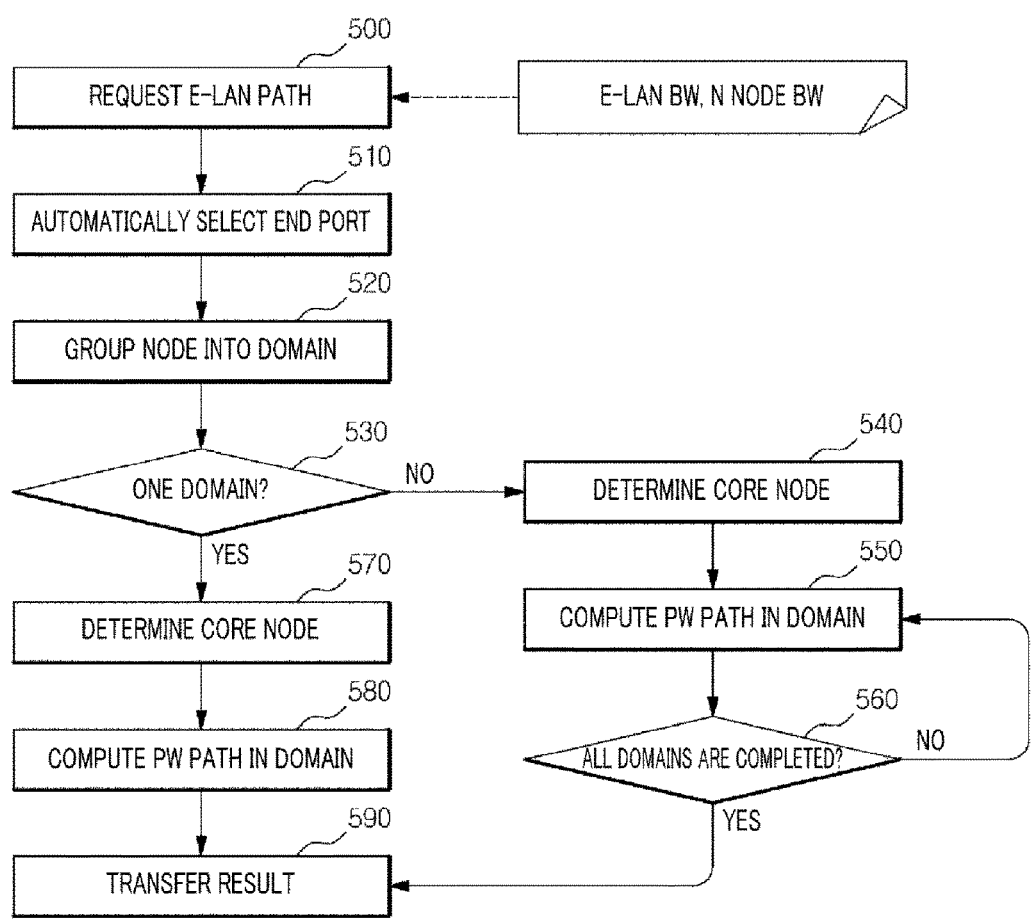
FIG. 5 is an example flow diagram illustrating a method for computing an optimum path between multi-nodes, in accordance with at least some embodiments described herein.

FIG. 5 is an example flow diagram illustrating a method for computing an optimum path between multi-nodes by the path computation module 130, in accordance with at least some embodiments described herein.

Referring to FIG. 5 and FIG. 2B, in process 500, client 190 may request for E-LAN services with a reference to N target nodes, and include information including, e.g., user bandwidths BW for the respective target nodes and an E-LAN bandwidth BW. The target nodes and the user bandwidths BW may be obtained from the multi-node information MultiNodes included in the multi-node path request RequestPathEvplan transmitted by requesting client device 190.

In operation 510, transport SDN controller 100 may select an end port to accommodate a UNI from the target nodes located in an area for which an E-LAN service is requested with reference to the network information stored in the database 180. The end port is a port that may be used to be physically connected to the UNI. Location information and available network resource information of the target nodes may be automatically collected by configuration management module 140 and topology management module 150 and stored and maintained in database 180. The transport SDN controller may collect location information and available network resource information using any one of a regular polling method and a real-time information update method.

In operation 520, transport SDN controller 100 may classify the N target nodes into domains. The target nodes may be grouped with reference to a domain including an area in which a target node is located. For example, if requesting client device 190 inputs location information, e.g., an address, of where a target node will be used, information regarding a network device corresponding to the address may be searched in database 180. The resulting network device may be mapped to a domain to which the network device belongs. Thus, the N number of target nodes may be grouped into domains.

In operation 530, if the number of domains resulting from the grouping the N number of target nodes into domains is two or more, the process proceeds to operation 540; but if the number of resulting domains is one, the process proceeds to operation 570.

In operation 540, the transport SDN controller may determine a core node. The core node is a node for forming a PW in a tree configuration within a domain. In order to form a PW in a tree confirmation and maintain uniform transmission efficiency between target nodes, the core node may be selected from route nodes that are in charge of data aggregation but do not accommodate a UNI.

Therefore, different core nodes may be respectively selected for E-LAN services requested by different clients 190 in the same domain. Meanwhile, in another exemplary embodiment, the core node may be determined in advance. A method for determining a core node will be described with reference to FIG. 6.

In operation 550, transport SDN controller 100 may compute or calculate a PW in a tree configuration within a domain by applying an algorithm for a shortest path between target nodes located in the same domain. Further, each domain may be set to be a broadcast domain. That is, a VSI option set in a network device corresponding to a target node may be set as "spoke." A method for computing a PW will be described with reference to FIG. 7.

In operation 560, if a PW in a domain is computed or calculated with respect to all domains, the process may proceed to operation 590; but if there are any remaining domains, the process returns to operation 550 and a PW is computed. Meanwhile, for load distribution and line stability, a PW between domains is formed in a full mesh configuration that connects all core nodes. Herein, each domain may be set not to share broadcast traffic generated by another domain. That is, a VSI option set in a network device corresponding to a core node is set as a hub.

In operation 570, transport SDN controller 100 may select a node included in the corresponding domain as a core node. Since all of target nodes are located in the same domain, a root node of the corresponding domain may be selected as a core node.

In operation 580, transport SDN controller 100 may compute or calculate a PW in a domain in the same manner as described in operation 550.

In operation 590, transport SDN controller 100 may store and maintain the computed multi-node path in database 180, and assigned the reference number RefNumber.

Figure 6:
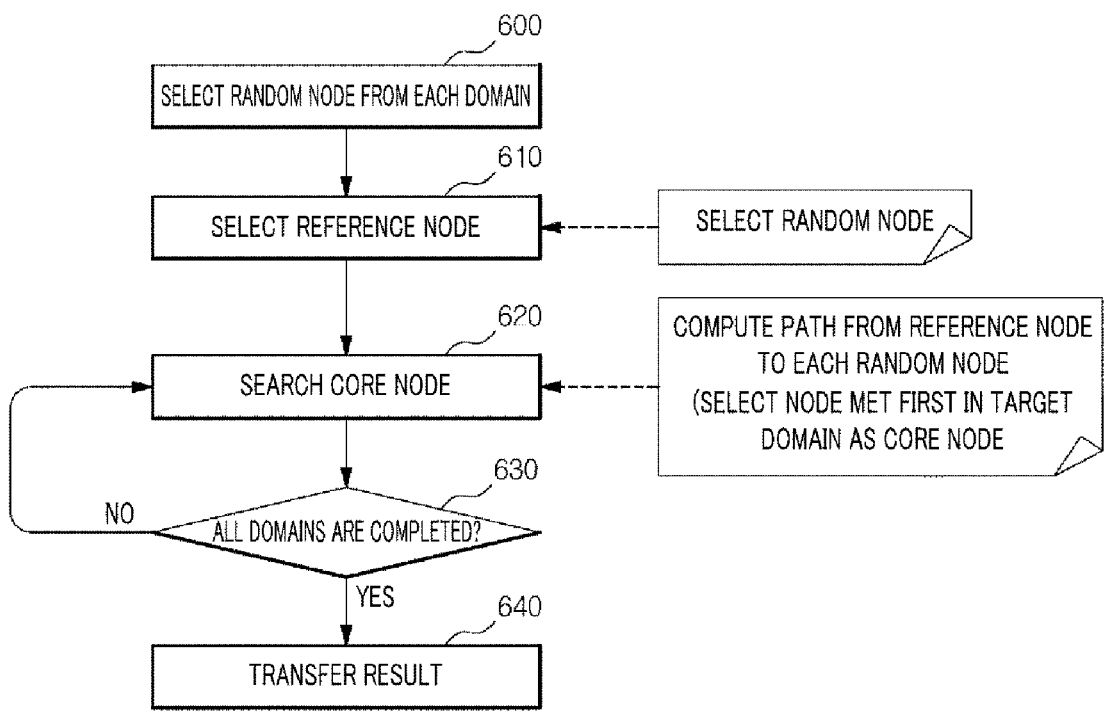
FIG. 6 is an example flow diagram illustrating a method for identifying or determining a core node, in accordance with at least some embodiments described herein.

FIG. 6 is an example flow diagram illustrating a method for identifying or determining a core node performed by the transport SDN controller, in accordance with at least some embodiments described herein.

Referring to FIG. 6 and FIG. 2C, in operation 600, performed by transport SDN controller 100, a random node may be selected from each domain.

In operation 610, a random node located in a random domain may be selected as a reference node. By way of example, one of the nodes selected in operation 600 may be selected as a reference node.

In operation 620, a shortest path from the reference node to a random node selected from each target domain may be computed or calculated. While the shortest path is computed, a node found first in a target domain in which a random node is located may be identified as or determined to be a core node in each domain. A core node in a domain to which the reference node belongs may be determined by computing a shortest path from the node selected in operation 600 to the reference node.

In operation 630, if core nodes in the all of the respective domains are determined, the process may proceed to operation 640 and the determined core nodes are transferred; but if there is any domain of which a core node is not yet determined, the process may return to operation 620.

Figure 7:
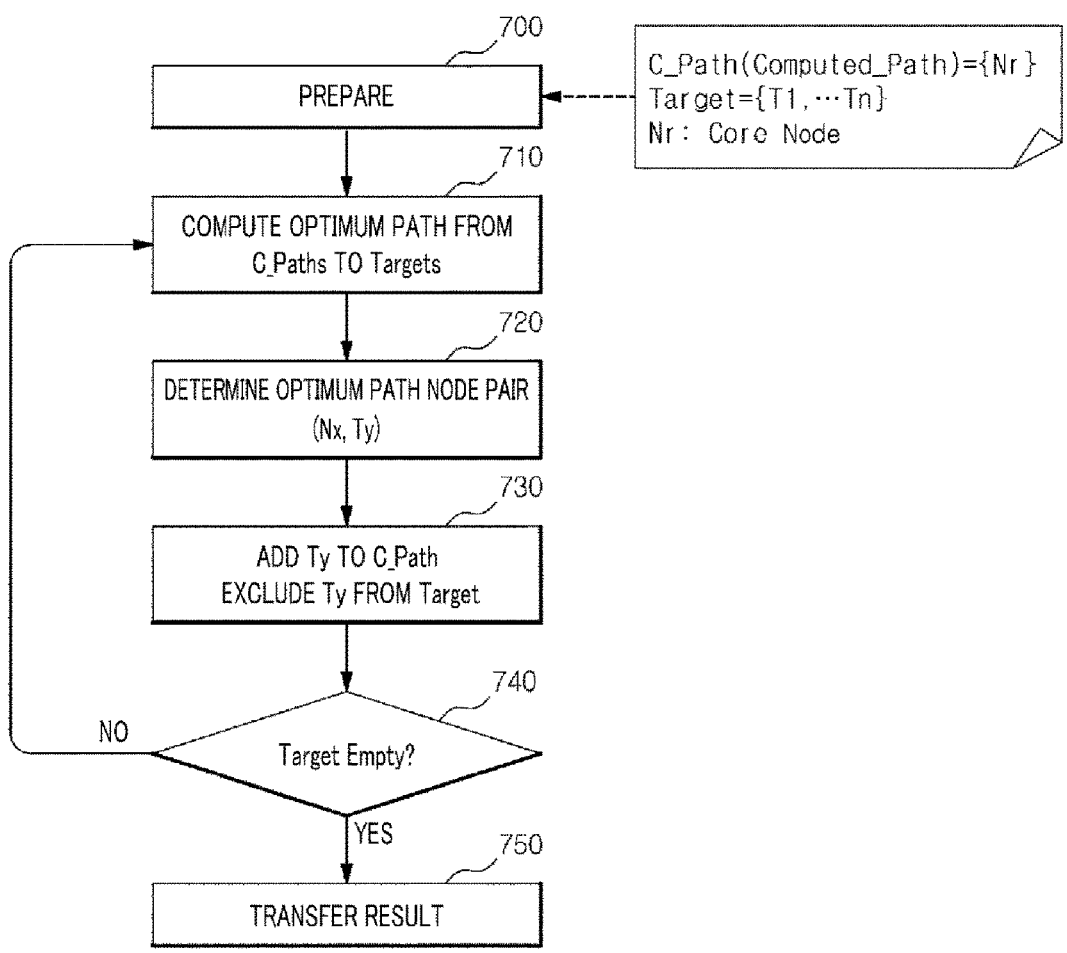
FIG. 7 is an example flow diagram illustrating a method for computing a PW path, in accordance with at least some embodiments described herein.

FIG. 7 is an example flow diagram illustrating a method for computing a PW path performed by the transport SDN controller, in accordance with at least some embodiments described herein.

Referring to FIG. 7 and FIG. 2D, in operation 700, performed by transport SDN controller 100, a computed path set C_Path and a target node set Target including target nodes may be prepared. In the beginning of calculation, the computed path set C_Path may include only one core node of each domain. For example, if there are four target nodes, in the beginning, the computed path set C_Path includes {core node} and the target node set Target includes {target node 1, target node 2, target node 3, target node 4}.

In operation 710, optimum paths between the nodes included in the computed path set C_Path and the target nodes included in the target node set Target and costs therefor may be computed, based on network information. The optimum paths may be computed by applying a shortest path algorithm, e.g., Dijkstra algorithm, using a network hop count and available network resource information. For example, optimum paths and costs for pairs (core node, target node 1), (core node, target node 2), (core node, target node 3), and (core node, target node 4) may be computed. The computed optimum paths and costs for the respective node pairs may be stored and maintained in database 180.

In operation 720, a shortest path node pair (Nx, Ty) may be determined on the basis of the computed costs for the respective node pairs. By way of example, the pair (core node, target node 1) is determined as a shortest path node pair.

In operation 730, a target node Ty may be added to the computed path set C_Path and the target node Ty is excluded from the target node set Target. By way of example, the pair (core node, target node 1) is selected as a shortest path node pair in operation 720, the computed path set C_Path includes {core node, target node 1} and the target node set Target includes {target node 2, target node 3, target node 4}.

In operation 740, if the target node set is empty, the process proceeds to operation 750 and a result may be transferred to the client device. If not, the process may return to operation 710. If the process returns to operation 710, when optimum paths between the nodes included in the computed path set C_Path and the target nodes included in the target node set Target and costs therefor are computed, the previously computed optimum paths and costs for node pairs are already stored in the database 180. Thus, a computation or calculation may be performed to only node pairs which are not previously computed. By way of example, if the computed path set C_Path includes {core node, target node 1} and the target node set Target includes {target node 2, target node 3, target node 4}, optimum paths and costs for only pairs (target node 1, target node 2), (target node 1, target node 3), and (target node 1, target node) are computed. Then, an optimum path pair is determined among the node pairs stored in the database 180 and the newly computed node pairs. In this case, the pair (core node, target node 1) already determined as an optimum node pair is excluded.

Figure 8:
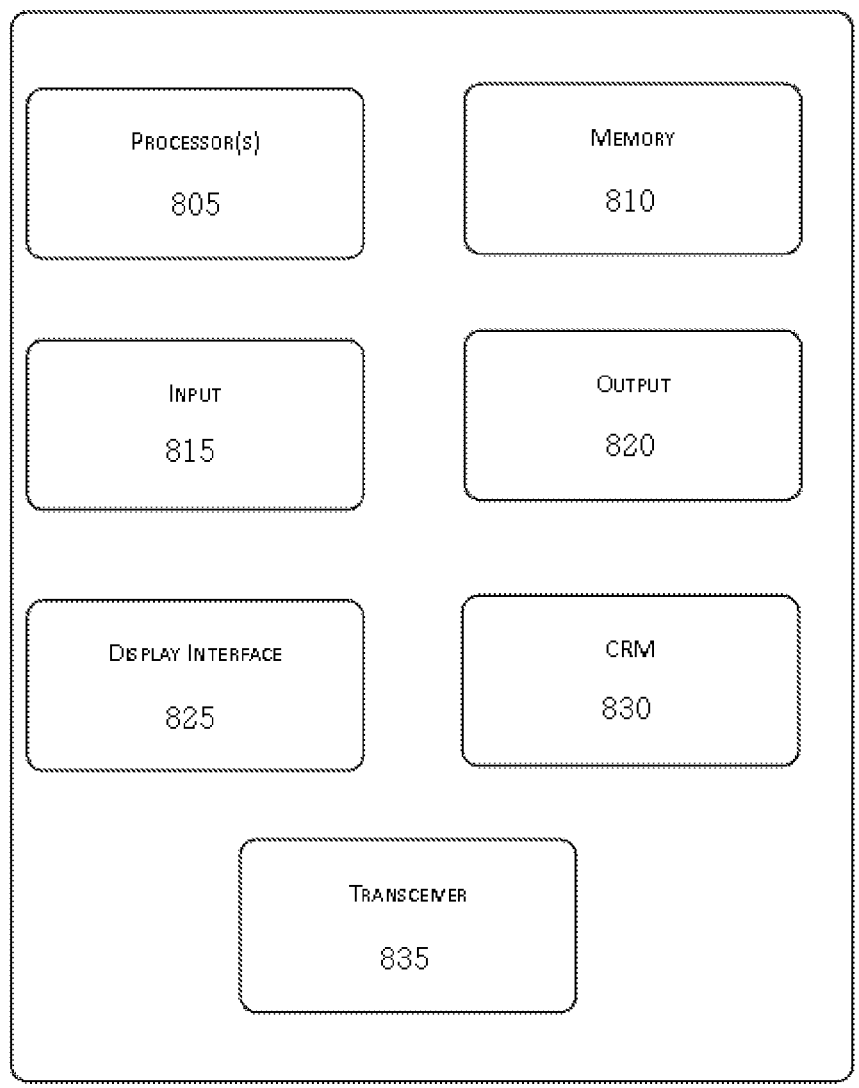
FIG. 8 shows an example computing device on which and by which at least portions of an E-LAN service may be implemented, arranged in accordance with one or more embodiments described herein.

FIG. 8 shows an example computing device on which and by which at least portions of an E-LAN service may be implemented, arranged in accordance with one or more embodiments described herein. The computer-readable instructions may, for example, be executed by a processor of transport SDN controller, as referenced herein, having a network element and/or any other device corresponding thereto, particularly as applicable to the applications and/or programs described above corresponding to the configuration 800 for an E-LAN service.

In a very basic configuration, a computing device 800 may typically include, at least, one or more processors 805 and a system memory 810. Computing device 800 may also include one or more input components 815, one or more output components 820, a display component 825, a computer-readable medium 830, and a transceiver 835.

Memory 810 may refer to, e.g., a volatile memory, non-volatile memory, or any combination thereof. Memory 810 may store, therein, an operating system, an application, and/or program data. That is, memory 810 may store executable instructions to implement any of the functions or operations described above and, therefore, memory 810 may be regarded as a computer-readable medium.

Input component 815 may refer to a built-in or communicatively coupled keyboard, touch screen, or telecommunication device. Further, an input component, if not built-in to computing device 800, may be communicatively coupled thereto via short-range communication protocols including, but not limited to, radio frequency or Bluetooth.

Output component 820 may refer to a component or module, which may be built-in or removable from computing device 800, which is configured to output data to an external device.

Display component 825 may refer to, e.g., a solid state display that may have touch input capabilities. That is, a display component may include capabilities that may be shared with or replace those of the aforementioned input components.

Computer-readable medium 830 may refer to a separable machine readable medium that is configured to store one or more programs that embody any of the functions or operations described above. That is, a computer-readable medium, which may be received into or otherwise connected to a drive component of computing device 800, may store executable instructions to implement any of the functions or operations described above. These instructions may be complimentary or otherwise independent of those stored by memory 810.

Transceiver 835 may refer to a network communication link for computing device 800, configured as a wired network or direct-wired connection. Alternatively, a transceiver may be configured as a wireless connection, e.g., radio frequency (RF), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method performed under a transport SDN (Software Defined Network) controller, comprising:
    classifying respective ones of a plurality of target nodes as either first target nodes that belong to a first domain or second target nodes that belong to a second domain;
    selecting a first core node in the first domain and a second core node in the second domain, wherein the first core node is selected from at least one root node in the first domain and the second core node is selected from at least one root node in the second domain based on a shortest path algorithm such that the second core node has a shortest path to the first core node in the second domain;
    calculating, within the first domain, a first pseudo-wire (PW) to connect the selected first core node and the classified first target nodes in a tree structure by utilizing a shortest path algorithm;
    calculating, within the second domain, a second pseudo-wire (PW) between the selected second core node and the classified second target nodes and
    forming a PW between at least the first domain and the second domain, connecting at least the selected first core node and the selected second core, in a full mesh configuration to provide load distribution and line stability.

2. The method of claim 1, wherein the selecting comprises:
    selecting a first random node in the first domain and a second random node in the second domain;
    calculating a shortest path between the first random node and the second random node;
    identifying the first core node in the first domain relative to the shortest path from the second random node to the first random node; and
    identifying the second core node in the second domain relative to the shortest path from the first random node to the second random node.

3. The method of claim 1, wherein calculating the first PW comprises:
    calculating a set of paths between the first core node and respective nodes of a target node set, the target node set including the classified first target nodes;
    from the calculated set of paths, calculating a shortest path between the first core node and each node included in the target node set, using the shortest path algorithm;
    determining, from the calculated shortest path, a pair of optimal path nodes; and
    moving one of the classified first target nodes corresponding to the pair of optimal path nodes from the target node set to the calculated set of paths.

4. The method of claim 1, wherein the shortest path algorithm is used for the calculating the first PW based on network information including a hop count and an available network source.

5. The method of claim 1,
    wherein the classifying includes classifying respective ones of the plurality of target nodes into third target nodes that belong to a third domain; and
    wherein the selecting includes selecting a third core node in the third domain; and
    wherein further, the selected first core node, the selected second core node and the selected third core node are inter-connected by the PW formed in a full mesh structure.

6. The method of claim 1, further comprising:
    prior to the classifying the plurality of target nodes into the first target nodes and the second target nodes, selecting a terminal port for accommodating a user network interface (UNI) from each of the plurality of target nodes.

7. The method of claim 1, wherein a bandwidth of the first PW is equal to a sum of respective bandwidths required for each of the first target nodes, and
    a bandwidth between the first domain and the second domain is equal to half of a sum of bandwidths of the first core node and the second core node.

8. A method performed under a transport SDN controller, comprising:
- classifying target nodes that belong to respectively corresponding domains;
- selecting core nodes from at least one root node, in the respectively corresponding domains, to be connected with the classified target nodes;
- calculating a pseudo-wire (PW), within the respectively corresponding domains, between the core node and classified target nodes, in reference to the core node, in a tree structure by utilizing a shortest path algorithm; and
- forming a PW between the respectively corresponding domains, connecting the selected core nodes in the respective domains, in a full mesh configuration to provide load distribution and line stability.

9. The method of claim 8, wherein the core node is selected from the at least one root node that is used for data aggregation without accommodating a user network interface (UNI).

10. The method of claim 8, wherein the calculating the PW between the core node and classified target nodes in reference to the core node includes:
- preparing a computed path set that includes the core node and a target node set that includes the target nodes;
- calculating a shortest path between each node included in the computed path set and each node included in the target node set by a shortest path algorithm;
- determining a pair of optimal path nodes based on the calculated shortest path;
- rearranging a target node of the pair of optimal path nodes from the target node set to the computed path set; and
- repeating the calculating, the determining and the rearranging until all of the target nodes are rearranged from the target node set to the computed path set.

11. The method of claim 8, wherein a bandwidth of the pseudo wire is equal to a sum of respective bandwidths required for each of the target nodes.

12. A transport SDN controller comprising:
- a path request processor configured to receive a multi-node path request from a client;
- a database configured to store network information related to network devices included in a first domain and a second domain; and
- a path calculator configured to:
  - retrieve the network information from the database,
  - classify, based on the network information, a plurality of target nodes into first target nodes that belong to the first domain and second target nodes that belong to the second domain,
  - select a first core node in the first domain and a second core node in the second domain, wherein the first core node is selected from at least one root node in the first domain and the second core node is selected from at least one root node in the second domain based on a shortest path algorithm such that the second core node has a shortest path to the first core node in the second domain,
  - calculate, within the first domain, a first pseudo-wire (PW) between the first core node and the first target nodes, in reference to the first core node, in a tree structure by using a shortest path algorithm,
  - calculate, within the second domain, a second pseudo-wire (PW) between the second core node and the second target nodes in reference to the second core node, and
  - form a PW between at least the first domain and the second domain, connecting at least the selected first core node and the selected second core node, in a full mesh configuration to provide load distribution and line stability.

13. The transport SDN controller of claim 12, wherein the path calculator is further configured to provide the client with the multi-node path that includes the first pseudo-wire (PW) and second pseudo-wire (PW) in response to the multi-node path request.

14. The transport SDN controller of claim 12, wherein the path calculator is further configured to:
- select a first random node in the first domain and a second random node in the second domain;
- calculate a shortest path between the first random node and the second random node;
- determine the first core node that is found first in the first domain as going along the shortest path from the second random node to the first random node; and
- determine the second core node that is found first in the second domain as going along the shortest path from the first random node to the second random node.

15. The transport SDN controller of claim 12, wherein the path calculator is further configured to:
- prepare a computed path set that includes the first core node and a target node set comprising the first target nodes;
- calculate a shortest path between each node included in the computed path set and each node included in the target node set by the shortest path algorithm;
- determine a pair of optimal path nodes based on the calculated shortest path;
- rearrange a first target node of the pair of optimal path nodes from the target node set to the computed path set; and
- repeat the calculating, the determining and the rearranging until all of the first target nodes are rearranged from the target node set to the computed path set.

* * * * *